United States Patent [19]
Yamada

[11] Patent Number: 5,656,846
[45] Date of Patent: Aug. 12, 1997

[54] SEMICONDUCTOR ACCELERATION SENSOR AND METHOD OF FABRICATION THEREOF

[75] Inventor: Keizo Yamada, Tokyo, Japan

[73] Assignee: NEC Corporation, Tokyo, Japan

[21] Appl. No.: 399,883

[22] Filed: Mar. 7, 1995

Related U.S. Application Data

[63] Continuation-in-part of Ser. No. 367,760, Jan. 3, 1995, which is a continuation of Ser. No. 899,283, Jun. 16, 1992, abandoned.

[30] Foreign Application Priority Data

Jun. 18, 1991 [JP] Japan ................................. 3-145151

[51] Int. Cl.$^6$ ................................................ H01L 29/82
[52] U.S. Cl. .................... 257/420; 257/415; 73/526; 73/514.33; 73/514.34; 73/514.14; 73/514.29; 310/326; 438/50
[58] Field of Search ............................. 257/416–420, 257/415; 437/921; 73/526, 514.14, 514.29, 514.33, 514.34; 310/326

[56] References Cited

U.S. PATENT DOCUMENTS

| | | | |
|---|---|---|---|
| 3,969,927 | 7/1976 | Yoshida et al. | 310/327 |
| 4,430,895 | 2/1984 | Colton | 73/497 |
| 4,498,342 | 2/1985 | Aske | 73/517 R |
| 4,604,594 | 8/1986 | Angerer et al. | 310/326 |
| 4,882,933 | 11/1989 | Petersen et al. | 73/517 R |
| 4,987,781 | 1/1991 | Reimann | 257/417 |
| 5,008,774 | 4/1991 | Bullis et al. | 73/517 R |
| 5,027,657 | 7/1991 | Juckenack et al. | 73/517 R |
| 5,062,518 | 11/1991 | Chitty et al. | 194/317 |
| 5,144,186 | 9/1992 | Thurn et al. | 310/326 |
| 5,165,289 | 11/1992 | Tilmans | 73/517 AV |
| 5,176,031 | 1/1993 | Peters | 73/517 R |
| 5,193,394 | 3/1993 | Suda | 73/766 |
| 5,218,420 | 6/1993 | Asmar | 356/352 |

FOREIGN PATENT DOCUMENTS

| | | | |
|---|---|---|---|
| 0340476 | 11/1989 | European Pat. Off. | 73/517 R |
| 698989 | 10/1953 | Germany | 310/326 |
| 59-196328 | 11/1984 | Japan . | |
| 63-206663 | 8/1988 | Japan | 73/517 R |
| 2-51634 | 2/1990 | Japan . | |
| 2-199996 | 8/1990 | Japan . | |
| 2-201166 | 8/1990 | Japan | 73/517 R |
| 3-170065 | 7/1991 | Japan | 73/517 R |
| 586542 | 12/1977 | U.S.S.R. | 310/326 |

OTHER PUBLICATIONS

L.M. Roylance, "A Batch–Fabricated Silicon Accelerometer," *IEEE Transactions on Electron Devices*, vol. ED–26, No. 12, Dec. 1979, pp. 1911–1917.

H.V. Allen et al., "Understanding Silicon Accelerometters," 10 pages, text beginning with A new class of sensors . . . on the first page and ending with . . . David Aupers. on the last page.

*Primary Examiner*—Jerome Jackson
*Assistant Examiner*—John Guay
*Attorney, Agent, or Firm*—Burns, Doane, Swecker & Mathis, LLP

[57] ABSTRACT

An acceleration sensor is provided with damping means on an upper surface and/or an lower surface of a movable portion of a sensor body and/or opposite regions surrounded by the movable portion and a rim of the sensor body in order to provide damping of a vibration to the movable portion of the sensor body. The damping means includes a material having a large mechanical damping constant, for example, a plastic, a gel, an inorganic material, and micro capsules. In a fabrication process of the acceleration sensor, a supporting film is provided on the movable portion of the sensor body, the damping material is provided on the supporting film and the movable portion of the sensor body is subjected to etching so as to form a weight and a diaphragm.

7 Claims, 4 Drawing Sheets

5,656,846

SEMICONDUCTOR ACCELERATION SENSOR AND METHOD OF FABRICATION THEREOF

The present application is a continuation-in-part of U.S. patent application Ser. No. 08/367,760, filed Jan. 3, 1995, now abandoned which is a continuation of U.S. patent application Ser. No. 07/899,283, filed Jun. 16, 1992, now abandoned, the subject matter of which is hereby incorporated by reference.

BACKGROUND OF THE INVENTION

The invention relates to a semiconductor acceleration sensor and a method of fabrication thereof.

Silicon etching technology instead of the conventional cutting processing has been employed to a fabrication of the semiconductor acceleration sensor. A typical semiconductor acceleration sensor in which air is employed as a damping material will hereinafter be described with reference to the accompanying drawings. Referring to FIG. 1, the semiconductor acceleration sensor comprises a upper stopper 51, a sensor body 52 and a lower stopper 53. The acceleration sensor has a sandwich construction of three layers. The sensor body 52 for sensing an acceleration comprises a middle layer in which a weight 54 made of a silicon and a beam 55 made of a silicon is formed as a monolithic construction. The upper and lower stoppers 51 and 53 are provided on the opposite sides of the middle layer of the sensor body 52 to protect the sensor body 52 in the middle layer and to provide a limitation to a vibration of the weight 54 in the sensor body 52. A depression 56 is also provided in the lower stopper 53 to allow a vibration of the weight. In this case, air is employed as a damping material, because in general air has a suitable temperature characteristic for a damping. Since air is a gas, a viscosity of air is likely to be independent of a temperature. Also, a viscosity coefficient of air is very small. It is therefore necessary to provide a very small clearance, for example, on the order of several microns, between the weight 54 and the lower stopper 53 so as to provide an effective damping to a vibration of the weight 54. In order to suppress a strain caused by a thermal expansion of the stoppers 51 and 53, silicon is preferably selected for the stoppers 51 and 53 as well as the weight 54. Also, a Pyrex glass, which has a coefficient of a thermal expansion near to that of silicon, is available.

Adhesion of the silicon sensor body 52 and the stoppers 51 and 53 of the silicon may be carried out by use of pressure welding of gold. Adjustment of the gold film thickness serving as an adhesive allows control of the clearance so as to realize a preferable damping to the vibration of the weight 54 of the sensor body 52. Adhesion of the sensor body 54 of the silicon and the Pyrex glass stoppers 51 and 53 may be carried out by use of electrostatic bonding method. The lower stopper 53 is provided with a depression by means of etching so that the preferable clearance between the weight 54 and the lower stopper 53 may be available.

An alternate conventional semiconductor acceleration sensor in which silicon oil is employed as a damping material will be described with reference to the accompanying drawings. Referring to FIGS. 2 and 3, since the silicon oil has a very high viscosity as compared with air, satisfactory damping may be provided to the vibration of the weight without providing a small clearance between the weight and the stopper. Since the silicon oil is essentially a liquid, a container for the silicon oil is required, for example, a metal case 62. A sensor body 61 is sealed with the metal case 62 before the silicon oil is fed into the metal case 62 through a silicon oil inlet 63 and a cap for the silicon inlet 63 is put thereon. When the silicon oil is fed into the metal case 62, a release of air from the metal case is required. A blow hole 64 for releasing the air within the metal case 62 is provided on the upper surface of the metal case 62. Further, at a bottom surface of the case, an electrode 65 is provided to receive and deliver an electric signal associated with acceleration.

However, the set forth conventional semiconductor acceleration sensor employs air as the damping material in order to provide damping to the vibration of the weight. In this case, although a temperature characteristic of air as the damping material is superior, the precise setting of a very small clearance between the weight and the stopper is required. It is difficult to fabricate such a semiconductor acceleration sensor.

Further, there is a disadvantage that, when an adhesion operation is carried out to cover the sensor body with the upper and lower stoppers, an needless stress or strain is generated in the sensor body. A height of a rim portion of the sensor body is relied on for providing a clearance between the weight and the stopper. In general, the sensor body being subjected to damping has a different height from that of the rim portion, because the sensor body is subjected to some stress or strain generated on the fabrication of the sensor body. It is difficult to fabricate the acceleration sensors having a predetermined damping characteristic.

Further, in the semiconductor industry, a fabrication process of feeding a silicon oil into a semiconductor device and sealing thereof are not common. In the above sensor using silicon oil, further requirements for the semiconductor acceleration sensor are the metal case 62 and the silicon oil feeding means, for example, the silicon oil inlet 63 and the blow hole 64 for releasing the air within the metal case 62.

SUMMARY OF THE INVENTION

An object of the present invention is to provide a novel semiconductor acceleration sensor capable of providing damping to a vibration of a movable portion of a sensor body with a simple structure so as to suppress unnecessary vibration of the movable portion of the sensor body.

Another object of the present invention is to provide a novel method of fabricating the semiconductor acceleration sensor.

A novel semiconductor acceleration sensor according to the invention is provided with at least a damping means around the movable portion of the sensor body so as to provide the damping to the vibration of the movable portion of the sensor body. The movable portion of the sensor body comprises a beam, a weight and a diaphragm. The beam is provided thereon with a detecting means such as a gauge resistor to detect a stress or strain of the beam caused by the vibration of the movable portion of the sensor body. Optionally, the damping means may be provided on an upper surface and/or an lower surface of the movable portion of the sensor body. Also, the damping means may be provided on opposite regions surrounded by both the movable portion and a rim of the sensor body. In this case, the damping means is preferably composed of a film. Further the damping means may be provided not only on the upper surface and/or the lower surface of the movable portion of the sensor body but also the opposite regions surrounded by both the movable portion and the rim of the sensor body.

The damping means is composed of a damping material having a large mechanical damping constant, for example, a plastic, suitably a photosensitive resin, a gel, an inorganic material or a micro capsule or the like. Since the high polymer such as a resin has a visco-elasticity and a slow damping effect to a mechanical shock, such as the high polymer allows to convert a strain energy caused by applying a mechanical force into a heat energy and other energy. Then, such as the high polymer allows to convert a vibration energy into the heat energy and other energy so as to provide damping to the vibration of the movable portion of the sensor body.

In a method of fabricating a semiconductor acceleration sensor, a supporting film is provided on the movable portion of the sensor body. The damping means is provided on the supporting film, before the movable portion of the sensor body is subjected to etching to form at least a weight and at least a diaphragm.

BRIEF DESCRIPTION OF THE DRAWINGS

Preferred embodiments of the semiconductor acceleration sensor and the fabrication method thereof according to the invention will hereinafter fully be described in detail with reference to the accompanying drawings in which.

PREFERRED EMBODIMENTS OF THE INVENTION

Figure 1:
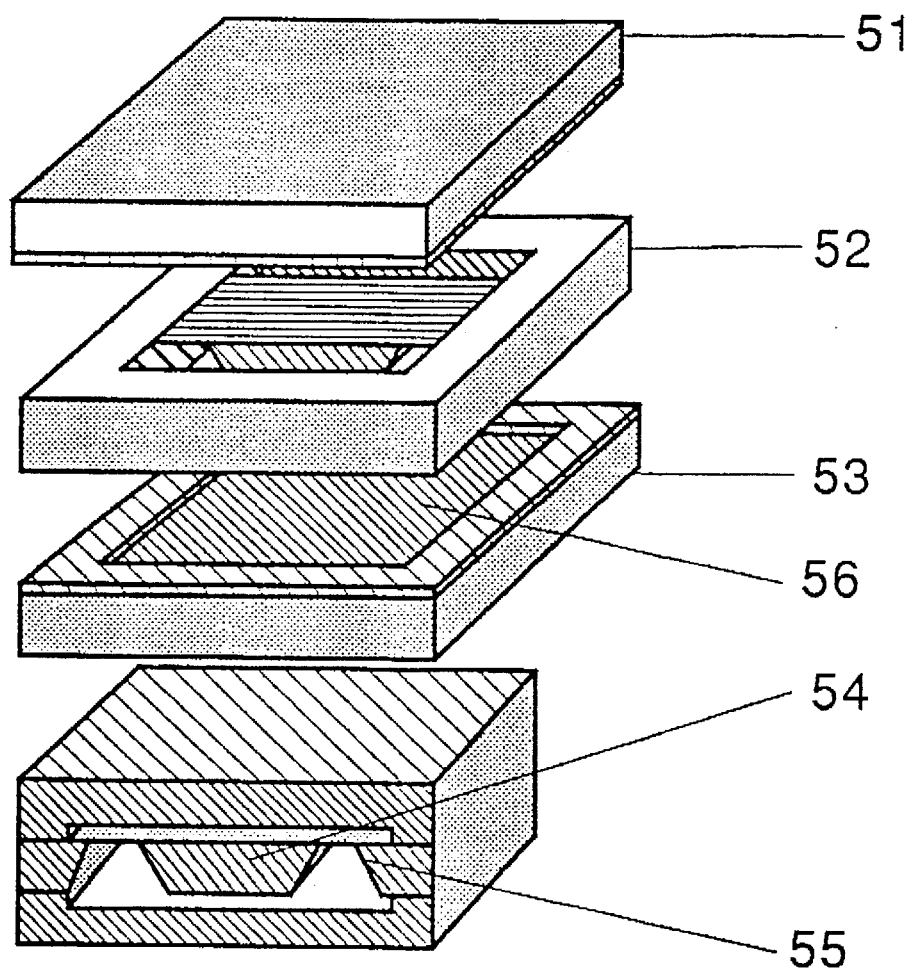
FIG. 1 is a perspective view showing one example of the conventional acceleration sensor employing air as a damping material.
Figure 2:
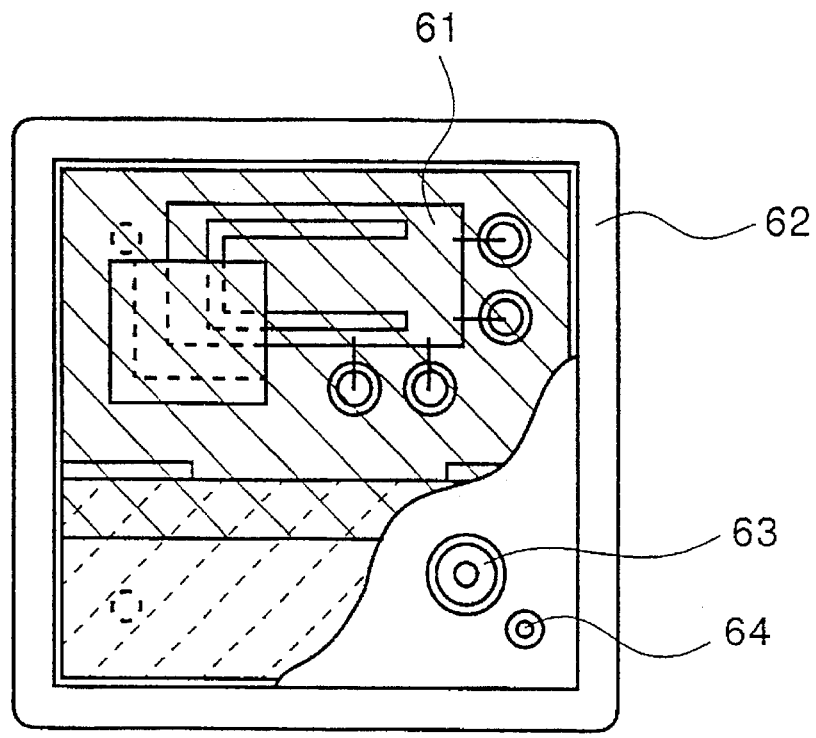
FIG. 2 is a partial cutaway view showing another example of the conventional acceleration sensor employing a silicon oil as a damping material.
Figure 3:
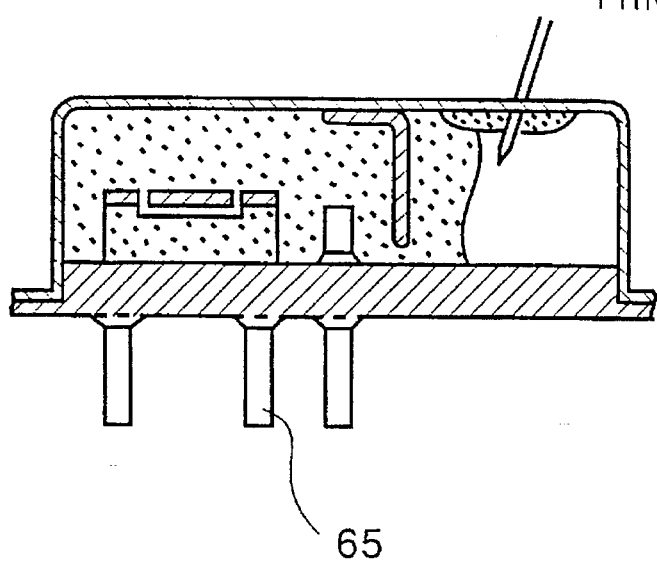
FIG. 3 is a vertical sectional view of the conventional acceleration sensor shown in FIG. 2.
Figure 4:
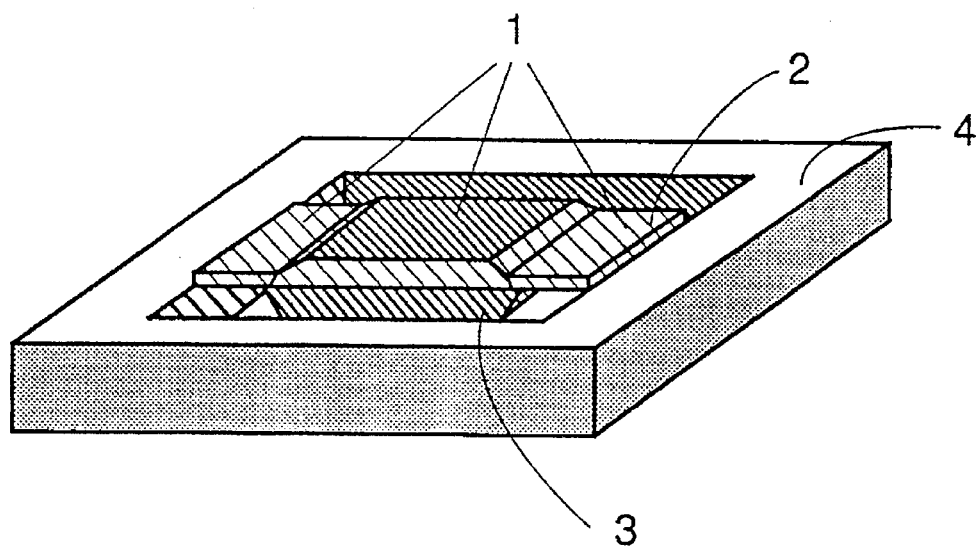
FIG. 4 is a fragmentary perspective view showing a first embodiment of a semiconductor acceleration sensor according to the present invention.

Referring now to FIG. 4, in a first embodiment, a novel semiconductor acceleration sensor 4 is provided with a resin 1 as a damping material coating an upper surface of a beam 2 formed thereunder with a weight 3 of a sensor body so that the beam 2 in vibration is subjected to a damping. The mass of the resin 1 serving as the damping material compensates an asymmetrical mass distribution of the weight 3 in the vertical direction. An amount of the resin 1 to coat the movable portion is regulated so that the mass of the resin 1 is equal to that of the weight 3, whereby the mass distribution of the weight 3 in the vertical direction is made symmetrical.

When a force caused by an acceleration is added to the weight 3, some stress and strain of the beam 2 in the vertical direction is generated so as to provide an acceleration sensor with a higher acceleration sensitivity in the vertical direction. In contrast, no stress or strain of the beam 2 in the horizontal direction is generated so as to provide an acceleration sensor with a lower acceleration sensitivity in the horizontal direction. There are various methods of coating the movable portion of the sensor body with the resin. A most convenient method thereof is a drop method of coating the resin by use of an automatic dispenser. A definition of the resin may conveniently be carried out in dependence upon any requirements. Further a definition of the photosensitive resin may readily be carried out in accordance with any requirements. The definition of the resin is carried out by a similar method to the well known normal photoresist process. Namely, the photosensitive resin is applied and cured by lighting at a predetermined portion at the beam 2 before the extra photosensitive resin is removed by use of a solvent.

Figure 5:
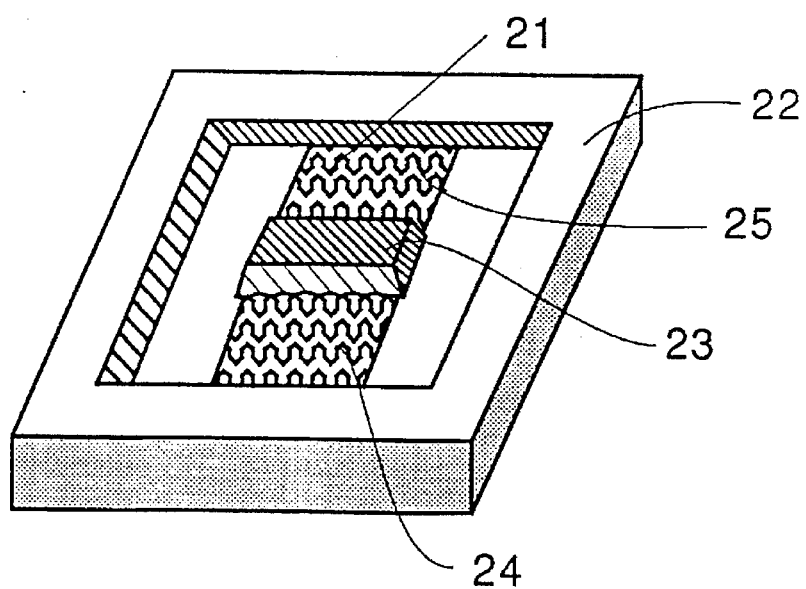
FIG. 5 is a fragmentary perspective view showing a second embodiment of a semiconductor acceleration sensor according to the present invention.

Referring to FIG. 5, in a second embodiment, a novel semiconductor acceleration sensor is provided with a resin 21 as the damping material on an lower surface a beam 24 as a movable portion of a sensor body. The beam 24 as the movable portion is provided thereunder with a weight 23. The beam 24 is provided thereunder with a depression 25 for the damping material and the resin may conveniently be applied to the lower side of the beam 24 by the depression 25. Consequently, the resin having a low viscosity may readily be applied more thickly to the lower side of the beam 24 so as to provide a larger damping to the vibration of the weight 23. In contrast, the upper surface of beam 24 as the movable portion of the sensor body 22 is provided with no resin, the semiconductor acceleration sensor therefore has an aesthetic impression on the sense of sight.

Figure 6:
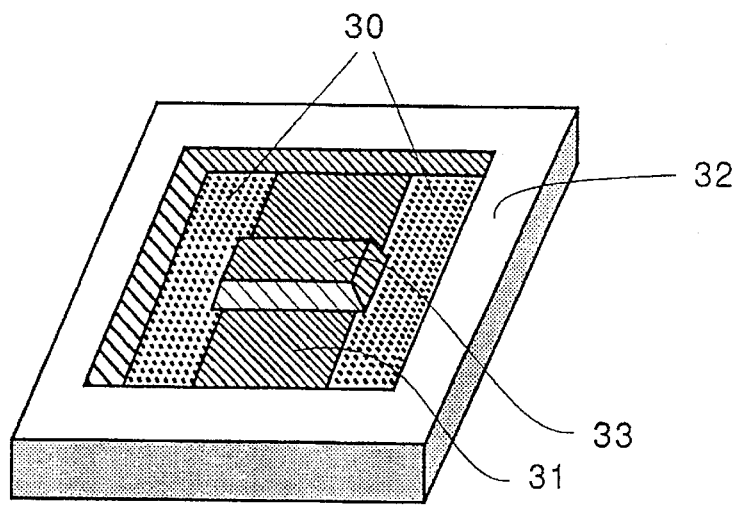
FIG. 6 is a fragmentary perspective view showing a third embodiment of a semiconductor acceleration sensor according to the present invention.

Referring to FIG. 6, in a third embodiment, the semiconductor acceleration sensor is provided with resins 30 composed of a film at opposite regions surrounded by a beam 31 as the movable portion and a rim 32 of the sensor body. In general, when a film is in a resonance state, an open end of the film has a large amplitude as a loop of a vibration. The resin composed of the film is provided as the damping means at the opposite regions surrounded by the beam 31 and the rim 32 of the sensor body so that an effective damping is provided to the vibration of the beam 31 as the movable portion of the sensor body. Further, since the resin is composed of the film, an air resistance is generated on the vibration. Thereby, the effective damping may be provided to the vibration of the movable portion of the sensor body.

Optionally, in the set-forth novel semiconductor acceleration sensor according to the invention, the damping means may be provided on an upper surface and/or an lower surface of the movable portion of the sensor body. Also, the damping means may be provided on opposite regions surrounded by both the movable portion and the rim of the sensor body in which the damping means is composed of a film. Further the damping means may be provided not only on the upper surface and/or the lower surface of the movable portion of the sensor body, but also the opposite regions surrounded by both the movable portion and the rim of the sensor body.

Further, the novel semiconductor acceleration sensor may employ a high polymer having the large mechanical damping constant for the damping material. In general, the high polymer, which is different from elastic materials such as metals, has a visco-elasticity and a slow damping effect to a mechanical shock. Then the high polymer may convert a strain energy caused by a deformation of the high polymer on applying a mechanical force into such as heat energy. Such as the high polymer is employed as a construction element in a mechanical system, the high polymer may therefore serve to reduce a kinetic energy existing in the mechanical system. Accordingly, when there is a vibration in a mechanical system, the high polymer allows to convert the vibration energy into a heat energy so as to provide a substantial damping to the vibration of the movable portion of the sensor body.

Furthermore, since the high polymer has a mass, the movable portion of the sensor body is added with the mass of the high polymer provided by providing the high polymer to the movable portion. This allows to increase the mass of the weight causing a vibration by an acceleration so as to realize a high sensitivity of the acceleration.

Still further, a photosensitive resin may readily be defined by lighting a predetermined portion of the movable portion of the sensor body. The above resin as the damping material may therefore arranged at any required portion around the movable portion of the sensor body.

Additionally, not only a plastic material or a resin but also a gel, a inorganic material and micro capsules are available for the damping material.

With respect to the embodiment using micro capsules, it is noted that each micro capsules comprise a very small hollow body of approximately spheric shape. Within the hollow body, a gas such as air is trapped. The hollowed sphere may be made of an organic or an inorganic material such as silica, a silicon resin or a synthetic rubber. The micro capsules serve as an air damping material insofar as they involve air trapped within a very small space defined by the hollow sphere. In practice, a great number of micro capsules serve as the air damping means.

To provide the micro capsules on a predetermined portion of the semiconductor acceleration sensor, a screen printing method is available. In this case, the micro capsules are mixed with an adhesive such as a heat setting adhesive or a photosensitive adhesive. Such an adhesive is required to have a large viscosity. A silk screen is prepared for adhesion of the adhesive to a predetermined portion on which the micro capsules will be provided. A squeegee is used to push and pull the mixture of the micro capsules and the resin across the silk screen for carrying out screen printing. Subsequently, a heat treatment is carried out for complete curing of the resin. Some of the micro capsules subjected to the heat treatment may expand due to the heat. Such expanded micro capsules are adjusted in size by use of a further, adequate heat treatment. The micro capsules are thus provided on the predetermined portion of the semiconductor acceleration sensor to serve as an air dampening means.

As an alternative of the screen printing method, a normal photoresist process is also available to place the micro capsules on a predetermined portion of the semiconductor acceleration sensor. In this case, the micro capsules are mixed with a photosensitive resin to be applied on a wafer on which the semiconductor acceleration sensor is provided. In the application of the micro capsule mixed with the photosensitive resin, a spin coater is adjusted in its rotational speed to allow the micro capsules, as mixed with a resin, to have the required thickness so that the resin is applied to the entire surface of the wafer.

The mixture of the resin and the micro capsules is then subjected to a dry treatment and subsequent exposure followed by development to remove the unnecessary part of the applied resin so that the desired part of the resin remains only in the predetermined portions of the semiconductor acceleration sensor.

The mixture of the resin and micro capsules remaining after removal of the unnecessary portion is then subjected to heat treatment for adjustment of the size of the individual micro capsule spheres and a subsequent curing thereof so that the micro capsules are provided on the predetermined portion involved in the semiconductor acceleration sensor, and thus serve as an air dampening means.

The formation of micro capsules spheres per se is conventional.

Figure 7:
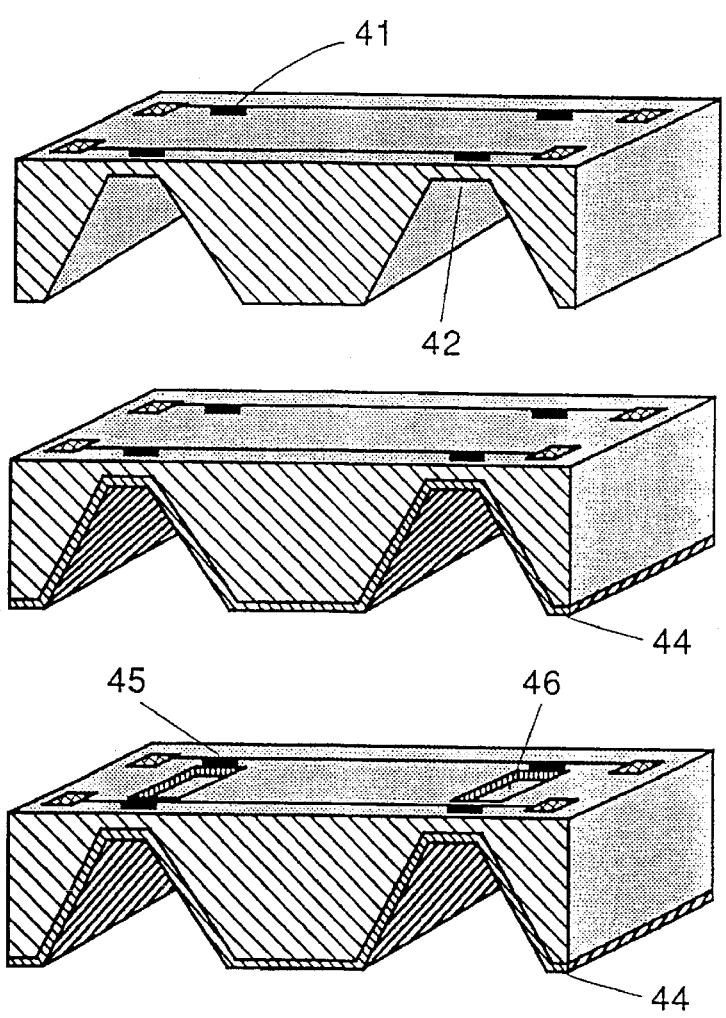
FIG. 7 is a perspective view showing a fabrication process of a movable portion of a sensor body in a semiconductor acceleration sensor according to the present invention.

A fabrication process of the movable portion of the sensor body will be described with reference to the accompanying drawings. Referring to FIG. 7, a supporting film is provided on the movable portion of the sensor body. A damping material is provided on the supporting film. A gauge resistor 41 for sensing stress or strain of the movable portion of the sensor body is formed on the surface of the movable portion by use of the well known normal gauge resistor fabrication process. An lower side of the movable portion of the sensor body is subjected to etching so as to form at least a diaphragm 42 made of silicon and a weight 43 made of a silicon. The lower side of the movable portion of the sensor body is subjected to an adhesion with a protective film 44 having a resistance to hydrazine, for example, a metal film such as gold. Consequently, the upper side of the movable portion of the sensor body is subjected to etching to form a depression region on a beam 45 before a removed region of the beam 45 by etching is subject to coating with a fresh resin 46 to complete the fabrication processes of the movable portion. After formation of the movable portion of the sensor body, If required, the protective film 44 with a resistance to hydrazine may be removed.

Although the conventional semiconductor acceleration sensor employing air has required to provide a small clearance between the weight and the stopper on condition of an extreme accuracy, the novel semiconductor acceleration sensor according to the invention is free of provision of a small clearance between the movable portion and the stopper on condition of an extreme accuracy with a more simple fabrication process. Also, a region to be provided with the damping means is freely selected by use of an automatic drop device so as to supply a superior damping characteristic to the acceleration sensor. Since the damping material has a weight, the resin of the damping material is provided on the opposite surfaces of the beam to realize a complete symmetry of the mass distribution of the weight. A center of gravity of the movable portion is in the vicinity of the center position of the movable portion so as to reduce the stress strain in the beam as the diaphragm in the horizontal direction with a lower sensitivity of the acceleration. The damping material is preferably selected in dependence upon a predetermined damping strength for variable semiconductor acceleration sensors.

Further, in the set forth acceleration sensor of the third embodiment, the beam of the sensor body is surrounded by the damping material to substantially suppress needless vibration of a free portion of the beam of the sensor body, so that a required damping may be provided to the movable portion of the sensor body with a satisfactory sensitivity of the acceleration sensor. Also, the damping material of the film formed on the region surrounded by the movable portion and the rim of the sensor body may provides the damping of the vibration to the movable portion, because the film as the damping material is subjected to the air resistance. This allows to provide a further effective damping of the vibration to the movable portion of the sensor body. A strength of the beam relatively increase with less damage on a fabrication process by providing the film as the damping material.

The conventional acceleration sensor including a silicon oil is required to provide at least a metal case. In contrast, the novel acceleration sensor according to the invention may employ the plastic as the damping material with a lower cost of fabrication of the acceleration sensor and a smaller size.

Whereas alternations and modification of the present invention will no doubt be apparent to a person of ordinary skill in the art, it is to be understood that the embodiments shown and described by way of illustration are by no means intended to be considered limitative.

Accordingly, it is intended that the claims cover all alternations of the invention which fall within the spirit and scope of the invention.

What is claimed is:

1. A semiconductor acceleration sensor comprising:

a vibrator having a mass movable primarily along a first axis;

a sensor body disposed beside said vibrator in a plane perpendicular to said first axis;

beams secured to said sensor body for supporting said vibrator; and a damping layer coated on an upper surface of said vibrator so as to allow a certain vibration of said vibrator and to control a damping property of said vibrator.

2. A semiconductor acceleration sensor in accordance with claim 1, wherein said damping film layer comprises at least one of the following materials: a plastic material, a photo-sensitive resin, a gel, and an inorganic material.

3. A semiconductor acceleration sensor comprising:

a vibrator having a mass movable primarily along a first axis;

a sensor body disposed beside said vibrator in a plane perpendicular to said first axis;

beams secured to said sensor body for supporting said vibrator; and a damping film layer coated on a lower surface of said vibrator so as to allow a certain vibration of said vibrator and to control a damping property of said vibrator.

4. A semiconductor acceleration sensor in accordance with claim 3, wherein said damping film layer comprises at least one of the following materials: a plastic material, a photo-sensitive resin, a gel, and an inorganic material.

5. A semiconductor acceleration sensor comprising:

a vibrator having a mass movable primarily along a first axis;

a sensor body disposed beside said vibrator in a plane perpendicular to said first axis;

beams secured to said sensor body for supporting said vibrator; and a damping layer film spanning between said vibrator and said sensor body at locations other than said beams so as to allow a certain vibration of said vibrator and to control a damping property of said vibrator.

6. A semiconductor acceleration sensor in accordance with claim 5, wherein said damping film layer comprises at least one of the following materials: a plastic material, a photo-sensitive resin, a gel, and an inorganic material.

7. A semiconductor acceleration sensor comprising:

a vibrator having a mass movable primarily along a first axis;

a sensor body disposed beside said vibrator in a plane perpendicular to said first axis;

beams secured to said sensor body for supporting said vibrator; and a damping layer film selectively covering said vibrator and said beams so as to allow a certain vibration of said vibrator and to control a damping property of said vibrator.

* * * * *